US006387500B1

(12) United States Patent
Behl

(10) Patent No.: US 6,387,500 B1
(45) Date of Patent: May 14, 2002

(54) MULTI-LAYERED COATINGS AND COATED PAPER AND PAPERBOARDS

(75) Inventor: Sanjay Behl, Fontainbleau (FR)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 08/965,245

(22) Filed: Nov. 6, 1997

(51) Int. Cl.[7] .............................. B32B 5/02; B32B 5/22; B32B 27/10; B32B 29/00

(52) U.S. Cl. .................... 428/404; 428/407; 428/537.5; 106/436; 106/464; 106/465; 106/474; 106/475; 106/486

(58) Field of Search .............................. 428/537.5, 407, 428/404; 106/486, 436, 464, 465, 474, 475

(56) References Cited

U.S. PATENT DOCUMENTS

| | | | | |
|---|---|---|---|---|
| 2,121,535 | A | 6/1938 | Amon | 106/473 |
| 2,439,442 | A | 4/1948 | Amon et al. | 23/209.1 |
| 2,766,127 | A | 10/1956 | Voet et al. | 106/27 |
| 2,793,100 | A | 5/1957 | Weihe | 423/460 |
| 2,867,540 | A | 1/1959 | Harris | 106/476 |
| 3,011,902 | A | 12/1961 | Jordon | 106/30 R |
| 3,025,259 | A | 3/1962 | Watson et al. | 106/476 |
| 3,094,428 | A | 6/1963 | Hamilton et al. | 106/307 |
| 3,317,458 | A | 5/1967 | Clas et al. | 260/41.5 |
| 3,335,020 | A | 8/1967 | Aboytes et al. | 106/476 |
| 3,423,391 | A | 1/1969 | Kindler et al. | 260/141 |
| T860,001 | I4 | 3/1969 | Gessler | 260/41.5 |
| 3,528,840 | A | 9/1970 | Aboytes | 106/473 |
| 3,577,555 | A | 5/1971 | Forrester et al. | 260/17.4 |
| 3,671,476 | A | 6/1972 | Terai et al. | 260/23 |
| 3,686,111 | A | 8/1972 | Makhlouf et al. | 524/530 |
| 3,904,929 | A | 9/1975 | Kanaya et al. | 317/2 R |
| 4,006,031 | A | 2/1977 | Ferch et al. | 106/473 |
| 4,014,844 | A | 3/1977 | Vidal et al. | 106/472 |
| 4,237,190 | A | 12/1980 | McGee | 428/513 |
| 4,265,768 | A | 5/1981 | Beasley et al. | 210/682 |
| 4,293,070 | A | 10/1981 | Ohlbach | 206/328 |
| 4,320,011 | A | 3/1982 | Sato et al. | 210/694 |
| 4,331,784 | A | 5/1982 | Ishibashi et al. | 525/313 |
| 4,366,139 | A | 12/1982 | Kühner et al. | 423/449 |
| 4,384,040 | A | 5/1983 | von Meer | 430/532 |
| 4,452,638 | A | 6/1984 | Gallus | 106/97 |
| 4,469,749 | A | 9/1984 | Schwarz | 428/403 |
| 4,530,961 | A | 7/1985 | Nguyen et al. | 106/20 R |
| 4,537,633 | A | 8/1985 | Hong | 106/96 |
| 4,543,128 | A | 9/1985 | Troesch et al. | 106/23 |
| 4,597,794 | A | 7/1986 | Ohta et al. | 106/20 C |
| 4,734,136 | A | 3/1988 | Burow | 106/304 |
| 4,820,751 | A | 4/1989 | Takeshita et al. | 523/215 |
| 4,831,011 | A | 5/1989 | Oikawa et al. | 502/406 |
| 4,943,456 | A | 7/1990 | Pollart et al. | 428/34.3 |
| 4,982,064 | A | 1/1991 | Hartman et al. | 219/10.55 E |
| 4,987,014 | A | 1/1991 | Woodward et al. | 427/278 |
| 5,002,826 | A | 3/1991 | Pollart et al. | 438/323 |
| 5,116,418 | A | 5/1992 | Kaliski | 106/419 |
| 5,118,747 | A | 6/1992 | Pollart et al. | 525/424 |
| 5,130,363 | A | 7/1992 | Scholl et al. | 524/392 |
| 5,131,910 | A * | 7/1992 | Breault | 8/400 |
| 5,153,061 | A | 10/1992 | Cavagna et al. | 428/325 |
| 5,159,009 | A | 10/1992 | Wolff et al. | 106/475 |
| 5,160,777 | A | 11/1992 | Woodward et al. | 428/172 |
| 5,184,148 | A | 2/1993 | Suga et al. | 106/20 R |
| 5,190,582 | A | 3/1993 | Shinozuka et al. | 106/20 D |
| 5,213,664 | A | 5/1993 | Hansell | 162/134 |
| 5,228,692 | A | 7/1993 | Carrick et al. | 273/139 |
| 5,281,261 | A | 1/1994 | Lin | 106/20 R |
| 5,282,887 | A | 2/1994 | Gay et al. | 106/261 |
| 5,344,487 | A | 9/1994 | Whalen-Shaw | 106/416 |
| 5,360,701 | A | 11/1994 | Elton et al. | 430/501 |
| 5,401,313 | A | 3/1995 | Supplee et al. | 106/475 |
| 5,423,911 | A | 6/1995 | Coutelle et al. | 106/416 |
| 5,478,388 | A | 12/1995 | Gane et al. | 106/415 |

(List continued on next page.)

FOREIGN PATENT DOCUMENTS

| | | |
|---|---|---|
| DE | 1948443 | 4/1971 |
| DE | 23 55 758 | 5/1975 |
| EP | 0 006 190 A1 | 1/1980 |
| EP | 0 475 075 A1 | 3/1992 |
| EP | 0 050 354 | 4/1992 |
| EP | 0 668 092 A1 | 2/1995 |
| EP | 0 801 173 A2 | 10/1997 |

(List continued on next page.)

OTHER PUBLICATIONS

Ullmann's Encyclopedia of Industrial Chemistry, 5th Edition, vol. A 18, pp. 645–652, May 1994.*

Derwent Abstract, AN No. 80–03330C, "Sulphonated Carbon Pigment Production by Treating Technical Grade Carbon with Hot Aqueous Acid," SU,A, 659523, Apr. 1979.

Derwent Abstract, AN No. 82–28019E, "Penetrating Flexographic Print Ink Based Polyacrylic Resin," Oct. 17, 1979, SU,A, 834062.

(List continued on next page.)

*Primary Examiner*—Paul Thibodeau
*Assistant Examiner*—Ramsey Zacharia

(57) ABSTRACT

A multi-layered coating for use preferably on paperboard or paper is disclosed wherein the coating contains at least two layers. The first layer contains at least one dark colorant, at least one white or near white pigment, and at least one binder, and the second layer contains at least one pigment other than a dark colorant, such as a white or near white pigment, and at least one binder. Slurries and dry mixtures containing these ingredients are also disclosed. A multi-layered coated paperboard or paper comprising paperboard or paper and the multi-layered coating is also disclosed. A method to reduce the amount of a white or near white pigment like titania is also disclosed which involves using one or more of the above-described multi-layered coatings on paperboard or paper.

39 Claims, No Drawings

U.S. PATENT DOCUMENTS

| | | | | | |
|---|---|---|---|---|---|
| 5,554,739 | A | | 9/1996 | Belmont | 534/885 |
| 5,559,169 | A | | 9/1996 | Belmont et al. | 523/215 |
| 5,571,311 | A | | 11/1996 | Belmont et al. | 106/20 R |
| 5,575,845 | A | | 11/1996 | Belmont et al. | 106/712 |
| 5,624,488 | A | * | 4/1997 | Forbus et al. | 106/484 |
| 5,630,868 | A | | 5/1997 | Belmont et al. | 106/31.75 |
| 5,654,357 | A | | 8/1997 | Menashi et al. | 524/495 |
| 5,672,198 | A | | 9/1997 | Belmont | 106/20 |
| 5,698,016 | A | | 12/1997 | Adams et al. | 106/31.6 |
| 5,707,432 | A | | 1/1998 | Adams et al. | 106/31.6 |
| 5,713,988 | A | | 2/1998 | Belmont et al. | 106/31.6 |
| 5,863,323 | A | * | 1/1999 | Mahmud et al. | 106/712 |
| 6,011,083 | A | * | 1/2000 | Okuda et al. | 523/161 |

FOREIGN PATENT DOCUMENTS

| | | | |
|---|---|---|---|
| FR | E 72775 | | 4/1960 |
| FR | 1331889 | | 5/1963 |
| GB | 862018 | | 3/1961 |
| GB | 1163651 | A | 9/1969 |
| GB | 1191872 | | 5/1970 |
| GB | 2 188 311 | A | 9/1987 |
| GB | 997 912 | | 7/1995 |
| GB | 2 299 036 | A | 9/1996 |
| JP | 49109614 | A | 10/1974 |
| JP | 74047463 | B | 12/1974 |
| JP | 50034687 | A | 4/1975 |
| JP | 50067644 | A | 6/1975 |
| JP | 52071246 | A | 6/1977 |
| JP | 52140613 | A | 11/1977 |
| JP | 53075939 | A | 7/1978 |
| JP | 56078629 | | 6/1981 |
| JP | 59053796 | A | 3/1984 |
| JP | 59/82467 | | 5/1984 |
| JP | 62/250073 | | 10/1987 |
| JP | 1097295 | A | 4/1989 |
| JP | 3099880 | A | 4/1991 |
| JP | 6067421 | | 3/1994 |
| KR | 9108307 | B | 10/1991 |
| SU | 220745 | A | 10/1968 |
| SU | 535542 | A | 12/1976 |
| SU | 659595 | A | 5/1979 |
| SU | 753963 | B | 8/1980 |
| WO | WO 91/02034 | | 2/1991 |
| WO | WO 91/15425 | | 10/1991 |
| WO | WO 92/13983 | | 8/1992 |
| WO | WO 95/01838 | | 1/1995 |
| WO | WO 96/18688 | | 6/1996 |
| WO | WO 96/18694 | | 6/1996 |
| WO | WO 96/18695 | | 6/1996 |
| WO | WO 96/18696 | | 6/1996 |
| WO | WO 96/37547 | | 11/1996 |

OTHER PUBLICATIONS

Derwent Abstract, AN No. 86–335147, "Wear Resistant Rubber Composition for Tire Tread Rubber,"Apr. 30, 1985, JPA 61–250042, Nov. 1986.

Derwent Abstract, AN N. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Patent Abstracts of Japan Publication No. JP7102166, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.

Roberts et al., *Basic Principles of Organic Chemistry*, Second Edition, W.A. Benjamin, Inc., Pub., p. 1080,. no date available.

Zoheidi et al., "Role of Oxygen Surface Groups in Catalysis of Hydrogasification of Carbon Black by Potassium Carbonate," *Carbon*, vol. 25, No. 6, pp. 809–819, 1987, no month available.

International Search Report for PCT/US 97/08049 mailed Sep. 15, 1997.

Delamar et al., J. Am. Chem. Soc. 1992, 114, 5883–5884, no month available.

* cited by examiner

MULTI-LAYERED COATINGS AND COATED PAPER AND PAPERBOARDS

BACKGROUND OF THE INVENTION

The present invention relates to dry mixtures, slurries, coating formulations, and coated paperboards and paper, and in particular, relates to the use of dark colorants such as carbon black, in dry mixtures, slurries, coating formulations, and coated paperboards and paper.

Paper is distinguished from board or paperboard primarily on basis weight (or grammage). The term "paper" is generally applied to sheets having basis weights of 20 to 170 g/m$^2$ while the term "board" or "paperboard" refers to basis weights of 130 to 450 g/m$^2$. As there is some overlap in basis weights, a further distinction is based on stiffness and end uses. At equivalent basis weights, a board will be stiffer and more rigid than paper. Board or paperboard is typically used for packaging applications. Paperboards are generally formed from both bleached and unbleached pulp as well as recycled fiber. Examples include unbleached kraft and recycled board. Generally, coated paperboard is used in printed packaging applications. The primary objective in coating paperboard is to improve the appearance and smoothness of the surface before printing. When paperboard surface brightness is low and/or has a mottled appearance and a good quality print is desired, mills may apply two or more coatings to form a glossy surface suitable for printing. For example, coated recycled multi-ply boxboard usually consists of a "white" fiber top liner, a middle brown liner and a gray bottom liner. Depending on the finish used, the brightness of the top liner can range from 35 to 65% and is typically unsuitable for printing. Double or triple coatings can be employed to hide surface imperfections.

To obtain a suitable coated surface for printing, the pigments chosen must provide a cost effective means of achieving the required degree of opacity for even coverage (reduced mottle) at a specified brightness (usually in the range of 70 to 80%). In addition, the coating should preferably exhibit good ink receptivity and have acceptable physical properties. A wide variety of white or near white pigments are available for use in coating applications. These include various grades of clays, including structured and calcined clays, natural and synthetic calcium carbonate, precipitated silicas, aluminum trihydrate, plastic (polystyrene) pigments, and titanium dioxide. Pigments such as No. 2 and calcined clays are often used in the base coating to provide leveling. Although expensive, titanium dioxide, because of its excellent opacifying properties, is often used either in the top coat and/or in the base coat to achieve good coverage and high brightness. However, because of its high cost, mills often try to replace or extend the use of titanium dioxide with less expensive pigment alternatives. The coating weight applied depends on the tradeoffs between a variety of considerations such as cost, acceptable percent weight increase, available drying capacity, and surface physical properties.

Conventionally, the base coat is applied to the paperboard to achieve a dried coating weight in the range of about 4 to 30 g/m$^2$ and more typically in the range of 6 to 20 g/m$^2$. Thereafter, the base coated paperboard is dried and then recoated with a top coat to achieve a dried top coating weight in the range of about 4 to 30 g/m$^2$ and more typically in the range of 6 to 20 g/m$^2$. The purpose of the top coating is to provide a uniform surface of high brightness (as well as exhibiting good ink receptivity so that good print quality can be attained) and high gloss (as well as smoothness). Achieving these objectives is difficult when the top layer of the paperboard is composed of unbleached pulp or contains large amounts of recycled fiber so that the surface is either highly mottled and/or dark in color. In such cases, because of its excellent hiding power and high brightness, the coating may contain substantial amounts of costly titanium dioxide pigment. Typically, a mixture of pigments is used to attain the required degree of coated properties, such as opacity and brightness. These pigments are generally various grades of kaolin clays, including structured and calcined clays, natural and synthetic calcium carbonate, precipitated silicas, aluminum trihydrate, and titanium dioxide. Titanium dioxide generally represents from 0 to about 25% of the total weight of white pigments employed.

Accordingly, there is need to find ways to reduce the amount of expensive pigments like titanium dioxide present in a paperboard or paper coating without substantially altering the mottle and/or brightness of the coatings. Also, there is a need to reduce Mottle Index in a more cost effective manner.

SUMMARY OF THE INVENTION

A feature of the present invention is to provide a coating on a substrate which reduces the mottle on the substrate, without reducing the brightness unacceptably.

Another feature of the present invention is to provide a coated paperboard or paper having a coating which is present in an amount to reduce mottle on the paperboard or paper without reducing the brightness unacceptably.

Another feature of the present invention is to provide dry mixtures which can be formed into slurries and ultimately into coatings on substrates like paperboard and paper.

Another feature of the present invention is to provide a method to decrease the amount of white or near white pigment in a coating located on a substrate, like a paperboard or paper.

Additional features and advantages of the present invention will be set forth in part in the description which follows, and in part will be apparent from the description, or may be learned by practice of the present invention.

To achieve these and other advantages, and in accordance with the purpose of the present invention, as embodied and broadly described herein, the present invention relates to a multi-layered coating comprising at least a first layer and a second layer. The first layer contains at least one dark colorant, at least one white or near white pigment, and at least one binder. The second layer contains at least one white or near white pigment and at least one binder. The dark colorant is present in the coating in an amount sufficient to reduce mottle on a substrate, while retaining at least 50% of the brightness compared to the substrate having the same multi-layered coating but with no dark colorant present. The dark colorant is preferably non-structured.

The present invention also relates to a multi-layered coated paperboard or paper containing the same ingredients as in the coating described above.

The present invention, in addition, relates to a dry mixture containing at least one dark colorant, at least one white or near white pigment, and at least one binder. Again, the dark colorant, when the dry mixture is formed into a coating, is present in an amount sufficient to reduce mottle on a paper or paperboard to which it is applied, while retaining at least 50% of the brightness compared to the paperboard or paper coated with the same coating having no dark colorant present.

The present invention also relates to a multi-component system for forming a coating on a paperboard or paper. In this system, a first slurry and a second slurry are prepared. The first slurry contains a solution or suspension having at least one dark colorant and the second slurry contains a solution or suspension having at least one white or near white pigment. A binder can be present in the first and/or second slurry or can be present in a separate slurry. The slurries, once combined, can form a coating for a paperboard or paper. The amount of the dark colorant present, when formed into a coating, is an amount sufficient to reduce mottle on the paperboard or paper while retaining at least of the brightness compared to the paperboard or paper coated with the same coating having no dark colorant present.

The present invention further relates to a slurry containing at least an aqueous or non-aqueous solution, at least one dark colorant, at least one white or near white pigment, and at least one binder. The dark colorant is present in an amount that when applied as a coating on a substrate, the mottle of the substrate is reduced while retaining at least 50% of the brightness compared to the substrate with the same coating having no dark colorant present.

The present invention relates to a method to decrease the amount of a white or near white pigment present in a coating in a paperboard or paper and a method to increase opacity which includes the steps of coating the paperboard or paper with a multi-layered coating comprising at least a first layer and a second layer. The first layer contains at least one dark colorant, at least one white or near white pigment, and at least one binder. The second layer contains at least one white or near white pigment and at least one binder. The dark colorant is present, again, in an amount sufficient to reduce mottle of the paperboard or paper or in an amount to increase opacity, while retaining at least 50% of the brightness compared to the paperboard or paper with the same multi-layered coating having no dark colorant present.

It is to be understood that both the foregoing general description and the following detailed description are exemplary and explanatory only and are intended to provide further explanation of the present invention, as claimed.

DETAILED DESCRIPTION OF THE PRESENT INVENTION

One embodiment of the present invention is a coating which is present on paperboard or paper. Generally, a coating composition contains at least one pigment, a binder, and other ingredients. The coatings of the present invention, which can be applied onto a substrate, like a paperboard or paper, contain at least one dark colorant, at least one pigment (i.e., a pigment other than a dark colorant) and at least one binder dispersed or dissolved in a liquid medium, which is preferably an aqueous solution, like water, but can be a non-aqueous solution. A coating dispersed in solution can also be considered a coating formulation or a "coating color" by those skilled in the art.

For purposes of the present invention, a dark colorant (e.g., a dark pigment and/or a dark dye) is a substance that imparts a black or blue color or tone to another material or mixture. The dark colorant can be a dye and/or pigment. The dark colorant is preferably a single aggregate pigment or a non-structured colorant, wherein structured is defined as a structural aggregate pigment or composite pigment made from two or more different principle particulate mineral species bound together by a polymer. The dark colorant is preferably not a composite pigment composed of two or more constituents thermally bound such as kaolin clay or bound by a polymer or complexing agents like microgels, but preferably is composed of single particles like black iron oxide pigments and structured single aggregate pigments as in carbon black pigments or the dark colorant is a dye. Mixtures of single particles, structured pigments, and dyes are also preferred. Examples of dark colorants include, but are not limited to, carbon pigments, iron oxide (e.g., BK 5099, Harcross), and black or blue pigments or dyes such as BASF Basid Black X-34 liquid and phthalocyanine blue W4123. Preferably, the dark colorant is a carbon-containing pigment. For purposes of the present invention, carbon-containing pigments include carbon black (e.g., furnace and channel black), graphite, vitreous carbon, activated charcoal, activated carbon, and mixtures thereof. Carbon black is preferred. The carbon-containing pigment may be of the crystalline or amorphous type. Finely divided forms of the above are preferred. Preferably, the dark colorant has a particle size and aggregate size that imparts a blue undertone.

For purposes of the present invention, a dark colorant can also be a modified carbon product having an attached organic group as described in PCT Publication No. WO 96/18688; U.S. Pat. No. 5,571,311; 5,630,868; and 5,554,739, all incorporated herein by reference. Methods for preparing these types of modified carbon products with an attached organic group are also described in the published application and patents. When a modified carbon product having an attached organic group is used as the dark colorant, it is preferred that the modified carbon product is a carbon black having an attached organic group wherein the organic group comprises an aromatic group which is preferably attached directly to the carbon black. More preferred organic groups are —p—$C_6H_4SO_3$—and/or —$C_6H_4CO_2$— groups.

Also, for purposes of the present invention a dark colorant includes an aggregate comprising a carbon phase and a silicon-containing species phase. A description of this aggregate as well as means of making this aggregate are described in PCT Publication No. WO 96/37547 as well as U.S. patent application Ser. No. 08/446,141, now U.S. Pat. No. 5,830,930; Ser. No. 08/446,142, now U.S. Pat. No. 5,877,238; Ser. No. 08/528,895, now U.S. Pat. No. 5,948,835, and 08/750,017, now U.S. Pat. No. 6,028,137. All of these patents, publications, and patent applications are hereby incorporated in their entireties herein by reference.

The dark colorant, for purposes of the present invention, can also be an aggregate comprising a carbon phase and metal-containing species phase where the metal-containing species phase can be a variety of different metals such as magnesium, calcium, titanium, vanadium, cobalt, nickel, zirconium, tin, antimony, chromium, neodymium, lead, tellurium, barium, cesium, iron, molybdenum, aluminum, and zinc, and mixtures thereof. The aggregate comprising the carbon phase and a metal containing species phase is described in U.S. patent application No. 08/828,785 filed Mar. 27, 1997, now U.S. Pat. No. 6,017,980, also hereby incorporated in its entirety herein by reference.

Also, for purposes of the present invention, a dark colorant includes a silica-coated carbon black, such as that described in PCT Publication No. WO 96/37547, published November 28, 1996, also hereby incorporated in its entirety herein by reference.

For purposes of the present application, the pigment other than a dark colorant is preferably a white or near white pigment. For purposes of the present invention, the term "white pigment" can also encompass near white pigments as well. These white or near white pigments preferably have a fine particle size and can be inorganic or organic. Examples of inorganic pigments include, but are not limited to, kaolin, finely ground natural calcium carbonate, precipitated calcium carbonate, calcined kaolin, titanium dioxide, aluminum trihydrate, talc, calcium sulfate (gypsum), precipitated silica, calcined clay, and the like. Organic pigments include, but are not limited to, styrene polymers, urea-formaldehyde resins and the like. Preferably, if titanium dioxide is used as a white pigment, an extender is also preferably used, such as No. 1 or No. 2 kaolin or calcium carbonate. Where more than one white or near white pigment is used in a given application, usually the less expensive pigment is used to replace the more expensive pigment. In an effort to minimize cost by reducing use of this higher cost pigment, other white or near white pigments may be used to "extend" the effect of the higher cost pigment. These other white pigments are referred to herein as extenders, and may be functionally defined as any white or near white pigment (as defined above). In other words, an extender is used to 'cut' the higher cost white pigment, thereby achieving acceptable results at reduced cost. A common, though non-limiting, example would be applications where titanium dioxide is the higher cost white pigment, and the extender is a substance such as calcium carbonate, kaolin, calcined clay, and/or aluminum trihydrate. In some cases, the extender can be used entirely; that is, in cases where the extender is able to completely eliminate the need for more expensive white pigments, such as titanium dioxide. Any extender commonly used by those skilled in the art in coatings for paperboard and paper can be used as the white or near white pigment, preferably with the other white or near white pigments, such as titanium dioxide, aluminum trihydrate, calcined clay or similar type pigments. More preferably, the paper coating extender pigment is a No. 1 or No. 2 clay, calcined clay, or finely ground calcium carbonate. In a preferred embodiment, when an extender is used in combination with a white or near white pigment like titanium dioxide, the clay or calcium carbonate is present in an amount of about 50% to 98% by weight of the total amount of pigment present, and the titanium dioxide and the like can be present in any amount, but preferably is from about 0% to about 25% by weight based on the weight of the coating.

The coatings of the present invention containing a dark colorant are preferably used as a base coat or an intermediate coat, or both. In some embodiments, the coatings of the present invention containing a dark colorant can be used as the top coat, either as a single coating or with other coatings. The coatings can be applied onto a substrate, like the paperboard or paper described earlier.

Generally, for single coating applications, the amount of dark colorant-present in a coating is an amount effective in reducing mottle while retaining at least 50% of the brightness compared to a substrate having the same coating but with no dark colorant present. More preferably at least 60%, at least 70%, at least 80%, at least 90%, and most preferably at least 97% of the brightness is retained, compared to a substrate having the same coating, but with no dark colorant present. In other words, mottle of the substrate (e.g. paper or paperboard) is reduced but, at least 50% of the brightness of the coated substrate is retained compared to a substrate having the same coating, but with no dark colorant present. Also, for purposes of the present invention, reducing mottle can be related to improving opacity of the coating.

When the coating containing the dark colorant is used with one or more additional coatings containing no dark colorant, the amount of dark colorant present in the coating is an amount effective in reducing mottle (compared to a substrate coated with the same overall coatings but without a dark colorant present in any coating) and retaining at least 50% of the brightness, once all coatings are applied (final brightness), compared to the brightness of the substrate with the same coatings but having no dark colorant present in any coating. Preferably, at least 60%, at least 70%, or at least 80% of the brightness is retained; more preferably at least 90% and even more preferably at least 97% of the brightness is retained.

With single coating or multiple coating applications, it is most preferred that the brightness, once all coatings are applied, is substantially the same as or greater than the brightness of the substrate having the same coating but without a dark colorant present.

Also, it is preferred that once the coatings of the present invention are applied onto a substrate (including all other optional coatings), the Hunter L value of the coated substrate is substantially the same as or higher than the substrate either with no coating or with the same coating but without a dark colorant present. As will be appreciated by those of ordinary skill in the art, the intensity of the particular dark colorant may affect the determination of the amount to be used. Thus, in general, as the intensity of the dark colorant increases, relatively smaller amounts of dark colorant may be used to achieve a desired effect. Conversely, relatively larger amounts of dark colorants having lesser intensity may be required to achieve the same effect. The following values are accordingly representative of common applications, but the selection of other amounts based on the particular dark colorant, such as carbon, and application may be readily determined by the skilled practitioner in view of the present invention.

Preferably, the dark colorant is present in a coating in an amount of from about 0.0025% by weight to about 0.200% by weight based on the dried weight of the total coatings, more preferably from about 0.005% to about 0.085% by weight and most preferably about 0.010% by weight. The use of a dark colorant preferably also conceals or reduces the yellow tone of the paperboard or paper and/or the yellow tone present in a previous coating or the coating containing the dark colorant.

With respect to the white or near white pigment, generally, the amount of white or near white pigment present in the coating is an amount effective to hide or mask the substrate. Preferably, the white or near white pigment, such as $TiO_2$, is present in an amount of from about 1% to about 30% by weight of the total dry coating, more preferably, from about 2% to about 25% by weight, and most preferably from about 10 to about 15% by weight of the total dry coating weight.

The amount of an extender (where extenders are white, non-titanium dioxide pigments), when present in the coatings of the present invention, can be any amount and is preferably present in an amount of from about 70% to about 99% by weight of the total dry coating and more preferably from about 85% to about 90%.

With respect to particle size of each of the components of the coating, any particle size commonly used in the paper or paperboard can be used.

The binder is present in an amount sufficient to bind the pigments and extenders, if present, to the substrate. Examples of binders include, but are not limited to, starch or latex.

In each of the coatings described above, additional optional ingredients, such as dispersants, that are traditionally used in coatings used for paperboard and paper can also be present. Suitable dispersing aids include but are not limited to, polyacrylates, polyphosphates, or other conventional dispersion aids. Other ingredients which can be present include thickeners, surfactants, biocides, defoamers, binder insolubilizers, lubricants and other ingredients that modify the properties of the coating color or the dry coating on the sheet. The types and amounts of each of these components that can be optionally present are known to or can be readily determined by those skilled in the art and these types and amounts of components can be used in the coatings of the present invention.

Generally, the coating formulations of the present invention can be applied in any amount to achieve dry coating weights traditionally used in the paper and paperboard industry. Preferably, the coating formulation is applied in an amount to achieve a dry coating weight in the range of from about 4 to about 30 g/m$^2$, and more preferably, from about 6 to about 20 g/m$^2$.

Once the coating(s) of the present invention is (are) applied, preferably the brightness of the coated paperboard is at least 60 (as measured by TAPPI T452), and more preferably at least 75. A coated paperboard brightness of from about 77 to about 80 would be most preferred. With respect to papers having a coating of the present invention, the following brightness (after the coating is applied) is preferred for the type of paper indicated:

Printing and Writing Grades

Premium—at least about 82, and preferably from about 82 to about 95
No. 1—at least about 82, and preferably from about 82 to about 88
No. 2—at least about 78, and preferably from about 78 to about 86
No. 3—at least about 76, and preferably from about 76 to about 84
No. 4.—at least about 72, and preferably from about 72 to about 82
No. 5. (LWC)—at least about 68, and preferably from about 68 to about 72

The coatings of the present invention can be prepared in the same manner as other conventional coatings for use in the paperboard and paper industry, except for the specific ingredients used. Generally, the coatings of the present invention are prepared by first forming a slurry containing the ingredients of the coating formulation. The ingredients can be added in any order and the medium is preferably an aqueous medium or solution such as water, but a non-aqueous medium can be used. The amount of aqueous solution, such as water, present in forming the slurry containing the dark colorant is generally from about 30% to about 70% by weight of the coating formulation. The slurry can be prepared by adding all of the ingredients, in any order, and mixing the ingredients for a sufficient time to form a substantially homogenous slurry. Preferably, the dark colorant is dispersed first in a solution and then the remaining components are added.

Thus, the present invention further relates to slurries containing at least one dark colorant, at least one white or near white pigment, and at least one binder.

The slurries of the present invention are preferably prepared by forming separate slurries of each individual ingredient of the coating formulation. In other words, a multi-component system for forming a coating on paperboard or paper can be used where a first slurry contains at least a dark colorant in an aqueous solution or suspension and a second slurry contains at least a paper coating pigment, like clay and/or a carbonate, or other white or near white pigment. Again, one or more of these slurries can contain one or more binders and/or optional additional ingredients described above. If the binder is not present in one of the slurries, the binder(s) can be added separately. Once the slurries are formed, the slurry which will be used to form a coating will be prepared by mixing the first slurry with the second slurry. As an example, if the first slurry contains a dark colorant and the second slurry contains at least clay, preferably at the end user's site, the two slurries would be mixed together to form a single slurry containing at least the dark colorant and the clay. When such a multi-component system is used to form a coating formulation, the amount of each component present in the separate slurries would be the same as described above. The formation of the slurry containing the dark colorant can, of course, be accomplished at the slurry manufacture's site or at the site where the paper coatings are manufactured.

The slurry is applied onto the paperboard and paper to form a coating by techniques known to those skilled in the art of coated paperboard and paper. After thorough mixing of all of the coating ingredients, the coating color can be applied to the sheet using various types of coating equipment known to those skilled in the art. Coatings may be applied using coaters such as conventional roll size presses, metering size presses, blade coaters, roll coaters, air knives, rod coaters as well as other application systems. A description of the formation of a coating from slurries as well as a discussion of equipment for applying coatings to the sheet of paper or paperboard can be found in "The Coating Process" by Jan C. Walter, 1993, Tappi Press, Atlanta, Ga., which is incorporated in its entirety by reference herein. For example, multiple coating formulations can be applied using a rod/air knife, blade/air knife, or rod/rod configuration.

The present invention also relates to dry mixtures of the ingredients or components which make up the various coatings and coating formulations of the present invention. These dry mixtures, which will be described below, can essentially be distributed to end users in the paperboard and paper industry and these end users can then take the dry mixtures and create slurries which can eventually be used to form coatings on paperboard and paper as described above. One dry mixture of the present invention would contain at least one dark colorant and at least one pigment other than a dark colorant such as a white or near white pigment in the amounts previously described above. Additional optional ingredients, previously described, can also be present in these dry mixtures.

An embodiment of the present invention would also include a coated paperboard or paper which comprises a paperboard or paper which has at least one coating of the present invention applied thereto either in direct contact with a surface of the paperboard or paper or in contact with a second coating which is directly or indirectly in contact with the paperboard or paper. At least one of the coatings on the paperboard or paper would be the same coatings described above such as a coating containing at least one dark colorant with at least one pigment other than a dark colorant, such as a white or near white pigment, and at least one binder in the amounts previously indicated.

The coatings of the present invention can be used in combination with other coatings traditionally used in the paper or paperboard industry. Thus, the coatings of the present invention containing the dark colorant would be one of two or more coatings on a paperboard or paper. Certainly, it is within the bounds of this invention to use more than one coating containing a dark colorant wherein the coatings containing the dark colorant can have the same or different coating formulations. Thus, another embodiment of the present invention is a paperboard or paper containing two or more coatings wherein at least one of these coatings contains a dark colorant in amounts previously described.

In a preferred embodiment of the present invention, the coated paperboard or paper contains two or more coating layers, wherein a base coat (which is the first layer) comprises at least one dark colorant and at least one additional paper coating constituent (e.g. a white or near white pigment), and at least one binder. The amounts of the ingredients would be same as described earlier. A top coat would be located on top of and in contact with the base coat. The top coat comprises at least one pigment other than a dark colorant, such as white or near white pigment, and at least one binder. One advantage of the present application is to provide a method to reduce the amount of white pigment, such as titania or other white pigment present in the base coat and/or top coat of a coated paperboard or paper. The present invention, for instance, permits the reduction of the amount of titania, in the top coat or non-base coat by at least 1%, more preferably, by at least 5%, and more preferably a reduction of from about 5% to about 100%, most preferably by at least about 50% by weight, with the use of a base coat comprising a coating of the present invention. The reduction in the amount of titania does not significantly affect the visual appearance of the final product which is important for consumer use and thus, if less titania can be used and substantially the same pleasing visual appearance of the coated paperboard or paper achieved, a less expensive product can be made and sold. It was quite unexpected that a dark colorant would lead to a product with reduced mottle and substantially the same brightness with the use of less titania, and/or would allow the use of extenders in greater amounts than conventional in the coated paper and paperboard industry. This latter effect means that use of higher cost pigments can be significantly reduced or even eliminated by making increased use of the more economical extenders.

The present invention will be further clarified by the following examples, which are intended to be purely exemplary of the present invention.

Examples

Mottle Index was determined using Tobias Mottle Instrument and the test described in Tobias, P.E. Ricks, L. and Chadwick, M, "Objective, reproducible measurement for printing mottle with a mottle tester," TAPPI (72) No. 5, 109 (1989), incorporated herein by reference.

Additionally, mottle was rated using a visual rating system as a supplement to the Mottle Index. Visual ratings of Mottle Index were determined by ranking the relative visual appearance of a series of samples for mottle, from worst to best; these rankings differ from the Mottle Index rankings obtained by using the Tobias Mottle Instrument at least in part because the Tobias measurement measures mottle at a point source, whereas the visual mottle was based on overall appearance of the sample.

Brightness was measured according to "Brightness of pulp, paper, and paperboard (directional reflectance at 457 nm)" TAPPI T 452 om-92.

Color was measured using the test "L, a, b, 45°0° colorimetry of white and non-white paper and paperboard," TAPPI T 524 om-86. Color is expressed according to the Hunter L, a, b scale.

Coating Compositions

A base coating, free of dark colorant, was prepared according to the formulations listed in Table 1. Pigments and dispersant were preslurried for 20 minutes using a Premier high shear disperser. Latex, alginate and dilution water were added and mixed using a low shear agitator. The resulting slurry, after adjustment to pH 8 with a 5% solution of sodium hydroxide had a viscosity of 0.7±0.1 Pa.s, as determined by means of a Brookfield RVT Viscometer using a #6 spindle at 100 RPM at 25° C. Colorant, either as a solution or as a dispersion, was then added to a portion of the base coating formulation. The percent pigment or dye in the dispersion or solution as well as amount of colorant added to form the tinted base coat formulation are listed in Table 2. The weight of the colorant dispersion added represented less than 0.1% of the total weight of the colorant-free base coating formulation and, accordingly, has a negligible effect on the coating composition (other than colorant level), solids content, and viscosity. The colorants represent either 0.012 to 0.066 weight% of the dry base coat coating weight or 0.006 to 0.033% of the total coating weight, since the base coat weight in this example is approximately 50% of the total coat weight.

TABLE 1

Base Coating Formulation Without Dark Colorant[a]

| Material | Parts | Weight % |
|---|---|---|
| DB Kote 2 (No.2 Clay) | 100 | 53.2 |
| Dow SBR Latex (dry basis) (Dow PB) | 18 | 9.6 |
| Dispex N40 Dispersant | 0.3 | 0.16 |
| LV Sodium Alginate Thickener | 0.2 | 0.11 |
| Water | 69.5 | 37.0 |

[a]Solids = 63%, Viscosity = 0.6–0.8 Pa.s

TABLE 2

Base Coating Formulation With Dark Colorant

| Dark Colorant | Solids (Weight %) | Grams Colorant Added To 100 g Base Coat Slurry | % Dry Colorant in Dry Base Coating | % Dry Colorant in Total Dry Coating |
|---|---|---|---|---|
| Carbon Black (Furnace) | 35.0 | 0.075 | 0.042 (unextended) | 0.021 |
| | | | 0.032 (extended) | 0.016 |
| Carbon Black (Channel) | 30.0 | 0.075 | 0.035 | 0.018 |
| Black Dye | 55.9 | 0.075 | 0.066 | 0.033 |
| Black Iron Oxide | 33.5 | 0.075 | 0.039 | 0.020 |
| Blue Pigment | 30.0 | 0.025 | 0.012 | 0.006 |

The blue pigment was phthalocyanine blue, the black dye was BASACID BLACK X-34 liquid and the carbon blacks used in Table 2 had the following characteristics:

| | Furnace Black | Channel Black |
|---|---|---|
| Iodine Number (mg/g) | 116 ± 7 | 68.5 |
| DBP (cc/100 g) | 70 ± 4 | 106.5 |
| ASTM Tint (% ITRB) | 118 ± 4 | 113.5 |
| Ash (%) | 1% MAX | 0.01% |

Extended carbon blacks were prepared by adding 30% dry pigment extender on wet weight of carbon black. This extension lowered the concentration of the carbon black to 26.9% in the carbon black dispersion. Coatings were prepared using the extended carbon blacks at the same level of addition (0.075% on wet wt. of coating). Based on 63% coating solids, this would imply that there is 0.032% by weight of carbon black in the dry base coating. From Table 2, the net addition of the dry pigment extender per dry base coating is 0.01% by weight.

The composition of a standard top coat formulation is listed in Table 3. A modified formulation in which part of the titanium dioxide is replaced by aluminum trihydrate is listed in Table 4. These formulations were prepared in a similar manner as the base coat formulation and had comparable viscosities and pH values.

TABLE 3

Standard Top Coat Formulation[a]

| Material | Parts | Weight % (Top Coat Formulation) |
|---|---|---|
| DB Kote 2 (No. 2 Clay) | 75 | 41.2 |
| Rutile Titanium Dioxide | 25 | 13.7 |
| SBR Latex (Dry basis) (Dow PB) | 16 | 8.8 |
| Dispex N40 Dispersant | 0.3 | 0.2 |
| LV Sodium Alginate Thickener | 0.2 | 0.1 |
| Water | 65.5 | 36.0 |

[a]Solids = 64%, Viscosity = 0.6–0.8 Pa.s

TABLE 4

Modified Top Coat Formulation[a]

| Material | Parts | Weight % (Top Coat Formulation) |
|---|---|---|
| DB Kote 2 (No. 2 Clay) | 75 | 41.1 |
| Rutile Titanium Dioxide | 15 | 8.2 |
| Aluminum Trihydrate | 10 | 5.5 |
| SBR Latex (Dry basis) (Dow PB) | 16 | 8.8 |
| Dispex N40 Dispersant | 0.3 | 0.2 |
| LV Sodium Alginate Thickener | 0.2 | 0.1 |
| Water | 65.5 | 36.0 |

[a]Solids = 64%, viscosity = 0.6–0.8 Pa.s

The coatings were applied to paperboard using a cylindrical lab coater (CLC 6000) with a puddle pond/rod configuration and the coater speed was adjusted between 1200–1400 fpm. The paperboard was a fourdenier, 36 brightness 20 pt. recycled paperboard having a weight of from 328–350 g/m$^2$ and a TAPPI Parker print soft smoothness at 10 kilopascals of about 4.02 to 4.12 microns. The paperboard samples were pre-dried on the cylindrical lab coater at 50% power for 10 seconds prior to coating. Different top coat weights were applied by adjusting the pressure of the rod against the cylinder. All data are reported at nearly constant base coat weights. Coat weights were determined by measuring the difference in sheet weight before and after coating application. The weight of the base coatings was maintained at about 12–13 g/m$^2$. The coatings were infrared dried at 100% power for 40 seconds. The samples were then cut. The Tobias mottle, Hunter L, a, b color, and TAPPI brightness of the samples were then measured. Measurements were performed on the uncalendered samples.

The effect of application of the conventional and base coats containing a dark colorant to paperboard at a constant coating weight of nearly 12 to 13 g/m$^2$ is illustrated in Table 5. The results indicate that the resultant Mottle Index is lower for the base coats containing a dark colorant than for the control base coat containing no dark colorant. Further, the brightness achieved with blue colorant and the black iron oxide and black dye are larger than that attained with the standard base coat while the L values are close to that of the standard coating. This demonstrates that dark colorants can be used to reduce mottle without loss in brightness. The carbon blacks used resulted in an excellent reduction in mottle and only a small reduction in brightness.

TABLE 5

Effect of Application of Conventional and Dark Colorant Base Coats to Paperboard

| Coating | Colorant added % (dry/dry) | Mottle (Tobias) | Mottle Visual | Brightness | Hunter Color L | Hunter Color a | Hunter Color b |
|---|---|---|---|---|---|---|---|
| Uncoated hoard | — | — | | 36.5 | 73.2 | 1.3 | 9.8 |
| Standard base coat | 0 | 315 | 1 | 52.8 | 78.0 | 2.0 | 3.7 |
| Iron oxide | 0.040 | 299 | 2 | 55.0 | 76.4 | 2.1 | 4.3 |
| Blue Pigment | 0.012 | 303 | 3 | 54.1 | 76.2 | 1.4 | 3.7 |
| Black Dye | 0.066 | 258 | 4 | 51.3 | 74.6 | 1.4 | 2.9 |
| Channel Black | 0.036 | 208 | 5 | 47.8 | 72.3 | 2.1 | 4.3 |
| Carbon Black (ATH extended) | 0.032 | 231 | 6 | 47.8 | 72.4 | 2.0 | 4.0 |
| Carbon Black (TiO2 extended) | 0.032 | 221 | 7 | 47.4 | 71.6 | 2.0 | 4.3 |
| Carbon Black (Calc. Clay extended) | 0.032 | 219 | 8 | 47.1 | 71.9 | 2.0 | 4.3 |
| Carbon Black | 0.042 | 152 | 9 | 43.3 | 68.2 | 1.9 | 3.4 |

*1 = worst, 9-best

Application of the conventional top coat of Table 3, at a constant coating weight of 12 to 13 g/m$^2$, to the precoated paperboards of Table 5 yields a double coated paper board with the Mottle Index and optical characteristics set forth in Table 6. The results in the table show that the Mottle Index of all the paperboards containing a dark colorant in the base coat is smaller than that containing no dark colorant. Further, the brightness values of the paperboards containing CB-Channel, Black Dye and blue pigment in the base coat exceeds that of the control while the L values are either comparable to or larger than that of the control. After application of the top coat, the brightness of the sample containing carbon black-channel exceeded that of the conventional base coated paperboard while that containing the carbon black-furnace approached the brightness of the conventional base coated paperboard.

TABLE 6

Mottle Index And Optical Characteristics of Paperboard With Various Base Coats And A Standard Top Coat (Table 3) (12 to 13 g/m$^2$ Coat Weight)

| Base Coat | Mottle (Tobias) | Mottle Visual | Brightness | Hunter Color L | Hunter Color a | Hunter Color b |
|---|---|---|---|---|---|---|
| Standard Top Coat | 176 | 1 | 77.1 | 88.6 | 1.3 | 1.2 |
| Black Dye | 128 | 2 | 80.2 | 90.1 | 1.1 | 0.7 |
| Iron Oxide | 175 | 3 | 75.2 | 88.7 | 1.3 | 1.1 |
| Carbon Black | 163 | 4 | 74.2 | 87.2 | 1.2 | 0.2 |
| Carbon Black (TiO2) extended) | 127 | 5 | 78.1 | 88.4 | 1.2 | 0.1 |
| Channel Black | 124 | 6 | 80.0 | 90.6 | 1.2 | −0.2 |
| Blue Pigment | 106 | 7 | 80.1 | 88.3 | 1.4 | 0.8 |

*1 = worst, 7 = best
[a]Top coat weight 13.7 g/m$^2$

Advantage of the enhanced brightness attained by adding a dark colorant to the base coat can be taken to either reduce the titanium dioxide content of the top coat or reduce the weight of top coating applied. The effect of changing top coat weight for paperboard containing about 12.5 g/m$^2$ of base coat containing the blue colorant is presented in Table 7. The data show that the top coat weight may be reduced to levels well below 9.9 g/m$^2$ without adversely affecting the Mottle Index while the brightness exceeds that of the paperboard containing the colorant-free base coat (Table 6).

TABLE 7

Effect Of Top Coat Weight On Base Coated Paperboard Containing Blue Pigment

| Top Coat Weight, g/m$^2$ | Mottle Index | Brightness, % | L | a | b |
|---|---|---|---|---|---|
| 16.6 | 127 | 80.77 | 90.1 | 0.7 | 0.3 |
| 13.7 | 125 | 80.01 | 88.3 | 1.4 | 0.8 |
| 9.9 | 106 | 80.09 | 88.1 | 1.3 | 0.9 |

The effect of using reduced levels of titanium dioxide in the top coat was investigated for the paperboard containing the base coat (about 12.5 g/m$^2$ base coat weight) containing the blue colorant. The top coat composition is that shown in Table 4. The effects of top coat weight on Mottle Index and optical properties are presented in Table 8. When compared to paperboard containing a dark colorant-free base coating and a top coating containing a high titanium dioxide level (see appropriate data in Table 6), these results show that the rutile titanium dioxide content and/or coat weight of the top coat can be reduced while producing a coated paper with a reduced mottle index and comparable or better optical properties.

TABLE 8

Effect Of Using A Top Coat With Reduced Titanium Dioxide Levels On Base Coated Paperboard Containing Blue Pigment

| Top Coat Weight, g/m$^2$ | Mottle Index | Brightness, % | L | a | b |
|---|---|---|---|---|---|
| 17.6 | 113 | 80.60 | 90.6 | 0.9 | 1.3 |
| 16.1 | 120 | 80.83 | 90.7 | 1.0 | 1.2 |
| 9.4 | 140 | 78.30 | 89.1 | 1.3 | 0.9 |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of increasing the brightness of a multi-layered coating comprising at least a first layer and a second layer, wherein said first layer comprises b) at least one white pigment, and c) at least one binder, and wherein said second layer comprises a) at least one white pigment and b) at least one binder, wherein said method comprises including in said first layer a) a dark colorant, that increases the brightness of the multi-layered coating, in an amount sufficient to reduce mottle on a substrate while increasing brightness compared to the mottle and brightness of the same substrate coated with the same multi-layered coating but having no dark colorant present, wherein said dark colorant is a blue or black dye, or said dark colorant is a modified carbon product comprising carbon having attached at least one organic group, or said dark colorant is an aggregate comprising a carbon phase and a silicon-containing species phase, or said dark colorant is a silica coated carbon black, or said dark colorant is an aggregate comprising a carbon phase and a metal-containing species phase, or combinations thereof.

2. The method of claim 1, wherein said white pigment of said first layer, said second layer, or both layers is a clay, a carbonate, titanium dioxide, or mixtures thereof.

3. The method of claim 2, wherein said clay is a Number 1 or 2 clay or a calcined clay.

4. The method of claim 2, wherein said carbonate is calcium carbonate.

5. The method of claim 2, wherein said clay is present in an amount of from about 0.1% by weight to about 98% by weight and said carbonate is present in an amount of from about 0.1% by weight to about 98% by weight, based on a total weight of the multi-layered coating.

6. The method of claim 1, wherein said dark colorant is a blue or black dye.

7. The method of claim 1, wherein said dark colorant is a modified carbon product comprising carbon having attached at least one organic group.

8. The method of claim 1, wherein said dark colorant is an aggregate comprising a carbon phase and a silicon-containing species phase.

9. The method of claim 1, wherein said dark colorant is a silica coated carbon black.

10. The method of claim 1, wherein said dark colorant is an aggregate comprising a carbon phase and a metal-containing species phase.

11. The method of claim 1, wherein said dark colorant is present in an amount of from about 0.001% by weight to about 0.25% by weight, based on the total weight of the multi-layered coating.

12. The method of claim 1, wherein said white pigment of said first layer, said second layer, or both layers is present in an amount of from about 1.00% by weight to about 99.98% by weight, based on the total weight of the multi-layered coating.

13. The method of claim 1, wherein said mottle is reduced by at least 3%.

14. The method of claim 1, wherein said mottle is reduced by about 3% to about 60%.

15. The method of claim 1, wherein said dark colorant is a non-structured dark colorant.

16. The method of claim 1, further comprising a third layer comprising at least one white pigment, which is the same or different from said pigment in the second layer, and at least one binder.

17. The method of claim 1, wherein said first layer and second layer further comprise a surfactant, a thickener, a biocide, a dispersing aid, a defoamer, a lubricant, or combinations thereof.

18. The method of claim 1, wherein said multi-layered coating has a Hunter L value which is about equal to or higher than either the substrate without a coating or the substrate coated with said multi-layered coating without a dark colorant.

19. A method of increasing the brightness of multi-layered coated paperboard or paper comprising a multi-layered coating of at least a first layer and a second layer, wherein said first layer comprises b) at least one white pigment, and c) at least one binder, and said second layer comprises a) at least one white pigment and b) at least one binder, wherein said method comprises including in said first layer a) a dark colorant, that increases the brightness of the multi-layered coated paperboard or paper, in an amount sufficient to reduce mottle on the paperboard or paper while increasing brightness compared to the mottle and brightness of the same paper or paperboard coated with the same multi-layered coating but having no dark colorant present, wherein said dark colorant is a blue or black dye, or said dark colorant is a modified carbon product comprising carbon having attached at least one organic group, or said dark colorant is an aggregate comprising a carbon phase and a silicon-containing species phase, or said dark colorant is a silica coated carbon black, or said dark colorant is an aggregate comprising a carbon phase and a metal-containing species phase, or combinations thereof.

20. The method of increasing brightness of multi-layered coated paperboard or paper of claim 19, wherein said white pigment of said first layer, said second layer, or both layers is a clay, a carbonate, titanium dioxide, or mixtures thereof.

21. The method of increasing brightness of multi-layered coated paperboard or paper of claim 19, wherein said dark colorant is a blue or black dye.

22. The method of increasing brightness of multi-layered coated paperboard or paper of claim 19, wherein said dark colorant is a modified carbon product comprising carbon having attached at least one organic group.

23. The method of increasing brightness of multi-layered coated paperboard or paper of claim 19, wherein said dark colorant is an aggregate comprising a carbon phase and a silicon-containing species phase.

24. The method of increasing brightness of multi-layered coated paperboard or paper of claim 19, wherein said dark colorant is a silica coated carbon black.

25. The method of increasing brightness of multi-layered paperboard or paper of claim 19, wherein said dark colorant is an aggregate comprising a carbon phase and a metal-containing species phase.

26. The method of increasing brightness of multi-layered coated paperboard or paper of claim 19, wherein said dark colorant is a non-structured dark colorant.

27. The method of increasing brightness of multi-layered coated paperboard or paper of claim 19, wherein said multi-layered coating further comprises a third layer comprising at least one white pigment, which can be the same or different from said white pigment in the second layer, and at least one binder.

28. The method of increasing brightness of coated paperboard or paper of claim 19, wherein said coated paperboard or paper has a Hunter L value which is about equal to or higher than either the paperboard or paper without a coating or the paperboard,or paper coated with said multi-layered coating without a dark colorant.

29. The method of increasing brightness of coated paperboard or paper of claim 19, wherein said mottle is reduced by at least 3%.

30. The method of increasing brightness of coated paperboard or paper of claim 19, wherein said mottle is reduced by about 3% to about 60%.

31. The method of increasing brightness of coated paperboard or paper of claim 19, wherein said first layer and second layer further comprise a surfactant, a thickener, a biocide, a dispersing aid, a defoamer, a lubricant, or combinations thereof.

32. A method to decrease the amount of a white pigment present in a coating on a paperboard or paper comprising the step of applying a multi-layered coating onto a paperboard or paper wherein said coating comprises at least a first layer and a second layer, wherein said first layer comprises a) at least one dark colorant, b) at least one white pigment, and c) at least one binder, and said second layer comprises a) at least one white pigment and b) at least one binder, wherein said dark colorant is present in an amount sufficient to reduce mottle on the paperboard or paper while increasing brightness compared to the mottle and brightness of the same paper or paperboard coated with the same multi-layered coating but having no dark colorant present, wherein said dark colorant is a blue or black dye, or said dark colorant is a modified carbon product comprising carbon having attached at least one organic group, or said dark colorant is an aggregate comprising a carbon phase and a silicon-containing species phase, or said dark colorant is a silica coated carbon black, or said dark colorant is an aggregate comprising a carbon phase and a metal-containing species phase, or combinations thereof.

33. The method of claim 32, wherein said white pigment of said first layer, said second layers or both layers comprises a titanium dioxide, a clay, a carbonate, or mixtures thereof.

34. The method of claim 32, wherein said dark colorant is a non-structured dark colorant.

35. The method of claim 32, said multi-layered coating further comprising a third layer comprising at least one white pigment, which is the same or different from said white pigment in the second layer, and at least one binder.

36. The method of claim 32, wherein said mottle is reduced by at least 3%.

37. The method of claim 32, wherein said mottle is reduced by about 3% to about 60%.

38. The method of claim 32, wherein said brightness on said substrate having the multi-layered coating is at least 36.

39. The method of claim 32, wherein said first layer and said second layer further comprise a surfactant, a thickener, a binder, a dispersing aid, or combinations thereof.

* * * * *